UNITED STATES PATENT OFFICE.

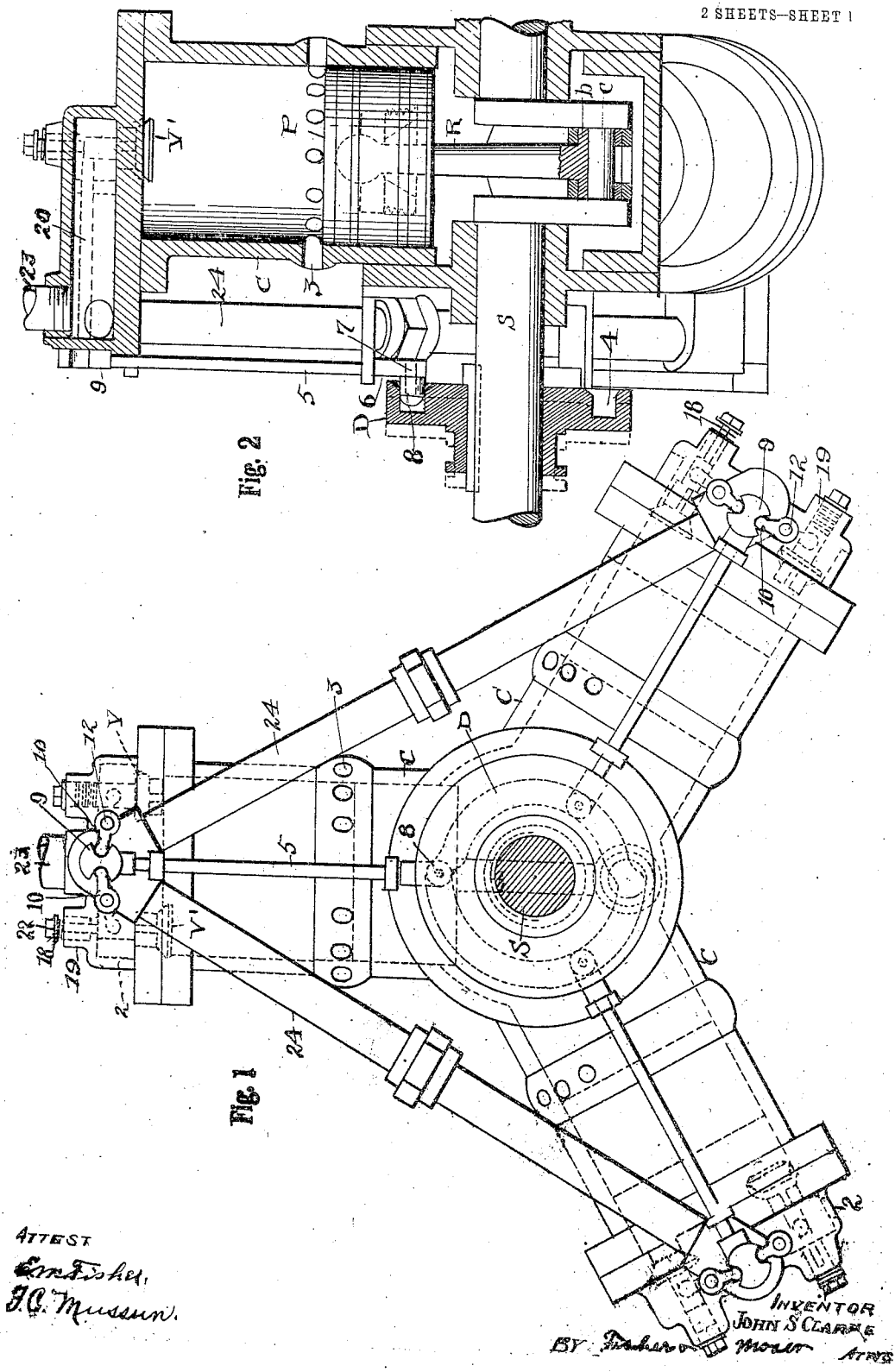

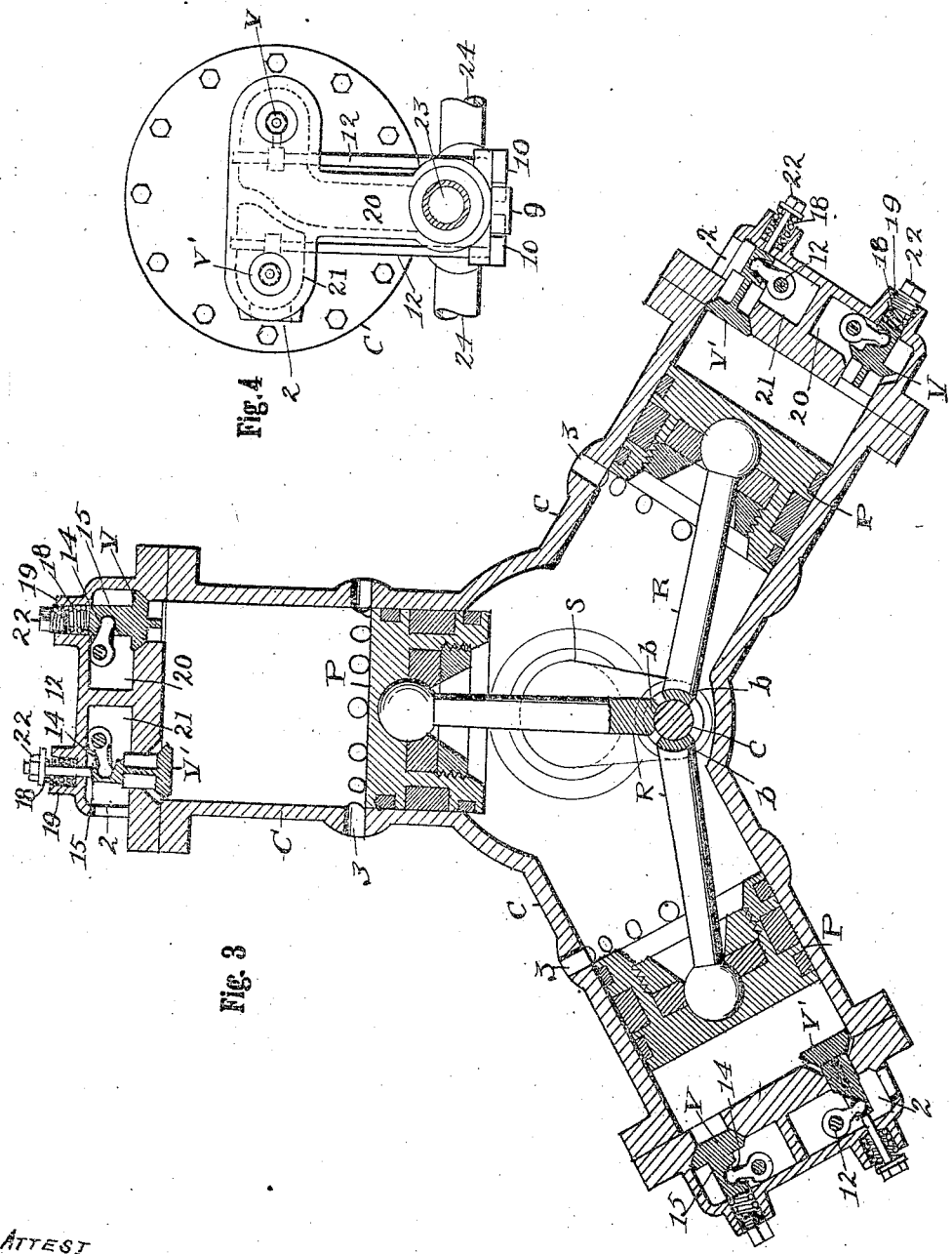

JOHN S. CLARKE, OF EAST CLEVELAND, OHIO.

CONVERTIBLE ENGINE AND COMPRESSOR.

1,055,611.   Specification of Letters Patent.   Patented Mar. 11, 1913.

Application filed November 20, 1911. Serial No. 661,306.

*To all whom it may concern:*

Be it known that I, JOHN S. CLARKE, citizen of the United States, residing at East Cleveland, in the county of Cuyahoga and State of Ohio, have invented certain new and useful Improvements in Convertible Engines and Compressors, of which the following is a specification.

This invention relates to a convertible engine and compressor, and the object of my invention is to provide a light and effectual apparatus for compressing air to a high degree of pressure for storage in a tank on an automobile or other vehicle or vessel and for cranking the engine for starting, and is also adapted to be used in garages and for starting stationary explosive engines and for other purposes, the construction being such as to occupy a very small space and to compress to various degrees according to the needs in any given case, say two hundred up to five hundred pounds.

In the accompanying drawings, Figure 1 is a side view of the engine, and Fig. 2 a sectional view of a portion thereof. Fig. 3 is a sectional view of the complete engine, and Fig. 4 is an end elevation of the initial cylinder.

The apparatus as thus shown consists of three cylinders radially disposed about a crank shaft and adapted to be used as an air compressor for compressing air for garages, automobiles, street cars, auto boats and the like, and also as a motor for cranking an engine as well as for other uses, the operation being to first use the engine for compression purposes and then by a mechanical change of valves use it for power to start a motor or other device.

The three several cylinders are represented by C and the crank shaft with which they are operatively connected by S. All the several pistons P are connected with the same crank by rods R and all work in conjunction, the arrangement bringing said cylinders one-third the distance around said shaft from each other and so that the operation will be continuous and uniform. The reverse of this is true when they are used as motors, and the air compressed in the storage tank or receptacle in the first instance becomes the source of power when the conversion is made from compressor to motor. The storage tank is not shown and the valves *v* relate to the passages which lead to and from said tank. When the device as a whole is used for compression valves *v* and *v'* are free to act independently, one of which then becomes an inlet valve from the open air and the other a discharge valve to the tank, but when the said device is used as a motor, as when cranking an automobile, the said valves are placed under control of a cam ring which opens them at the right times both for inlet or pressure from said tank and for exhaust. As to these functions, the valve *v* is the only one that communicates with the tank for both compression and power purposes, and valve *v'* is either an inlet or an exhaust valve to the open air by passage 2 according to the use. Fresh air inlets 3 are also shown in a circle about the middle of each cylinder and where they will be uncovered when the piston is fully retired as seen at the top in Fig. 3. Air can enter said cylinder through both the inlets 2 and 3, and when used as a motor they serve for exhaust.

Respecting the cam member D, it will be observed that it is slidably mounted on shaft S and has a cam shaped groove or channel 4 in its face from which all said valves *v* and *v'* are controlled for power purposes. To this end a stem or rod 5 is slidably mounted lengthwise on the outside of each cylinder and has a head 6 at one end with a side projection or pin 7 carrying a roller 8 running in the cam groove or channel 4, Fig. 2, while at the other end each rod 6 has a head 9 with opposite side notches or recesses adapted to receive the rounded ends of the inwardly projecting side arms 10 fixed on the valve controlling rods 12 at the ends of the cylinders, Fig. 4. These rods run transversely of said heads outside and at their opposite ends carry outwardly projecting arms 14 which engage in notches or recesses in the stems 15 of said valves *v* and *v'*, Fig. 3.

The valves *v* and *v'* are shown in the accompanying views as operated from or by the cam member D, so that the engines are working as motors, or as a motor considering that they are an operating unit. Any suitable mechanism for shifting cam D can be used, the scheme contemplating that the lever or means for throwing the cam into and out of connection with the valves is located conveniently to the operator.

It will be observed that the valves have springs 18 in pockets or recesses 19 on the outside of the cylinder heads and also outside of the passages 20 and 21 in said heads, and said springs are confined by nuts 22 on the outer ends of valve stems 15, and are adapted to hold said valves normally in closed position. The springs are, however, overcome in the present illustration by the action of cam D. Otherwise and when the device is used for compression of air the springs are free to act and perform their proper function.

In arrangement or position the valves v are located on the outside of the head proper of the cylinder in the air passage 20 and the nuts 22 are fixed in said pockets, while the valves v' are on the inside of the cylinder and the nuts 21 are fixed on the stems 15.

Of course the cam member D is arranged to rotate with shaft S at all times but is slidable on a spline or the like, and the edges of the cam groove are flared somewhat and the extremities of the projections 7 rounded or pointed to facilitate entrance into said groove or channel.

Connection between the air storage tank and the several cylinders is first by the direct pipe 23 from or to the air passage 20 in the head of one of the three cylinders and in this case from the upper cylinder, Fig. 1, and from thence by the diverging pipes 24 to or with the corresponding ends or air passages 20 in the heads of the other cylinders, thus establishing a common or like open communication between the head of each cylinder and the pipe 23 which leads to the tank. This equalizes working conditions between the cylinders so far as the air tank is concerned.

The piston rods R have each a segmental bearing b operatively confined upon the crank c of the shaft S with room between said bearings for all the play needed in each to accommodate the swing of the crank around its circle of travel.

The mechanism herein is adapted to be used as a motor to drive shaft S and crank the engine and as a compressor when shaft S is driven by the engine or engines.

What I claim is:

1. In a device as described, the combination of a plurality of cylinders arranged radially about a given center, a shaft with a crank in said center and pistons in said cylinders having rods operatively engaged on said crank, inlet and exhaust valves in the heads of said cylinders having springs to close the same, and mechanism operatively engaged with said shaft and adapted to actuate said valves mechanically against the action of said springs, whereby the said device is made convertible for compression or power purposes at will.

2. In a combined engine and compressor, a plurality of radially disposed cylinders and a crank shaft and pistons in said cylinders connected with said shaft, in combination with spring pressed valves in the head of each cylinder, cam controlled mechanism operatively connected with said shaft and adapted to open said valves against the tension of said springs and means to throw said mechanism out of working relations, thereby liberating said valves to work under their own spring action and converting the device from a motor to a compressor.

3. A combined engine and compressor as described and a crank shaft therewith, in combination with valves in the head of each piston and passages controlled by said valves, a cam member slidably fixed on said shaft having a cam groove in its side, and means to open and close said valves having the initial operating rods adapted to be engaged in said cam groove and rotatable rods having arms engaging said valves.

4. A combined motor and air compressor having a plurality of radially disposed engines and a crank shaft operatively connected therewith, a pair of valves in the head of each engine cylinder having springs and adapted to operate separately for compression purposes, in combination with mechanism to convert the parts into a motor comprising a cam slidable on said shaft and means to actuate the valves in each of said heads consisting of a rod operatively engaged in said cam and actuated thereby and rotatable shafts having arms engaged by said rod and arms engaged with said valves to move the same to and from their seats against the pressure of said springs.

In testimony whereof I affix my signature in presence of two witnesses.

JOHN S. CLARKE.

Witnesses:
E. M. FISHER,
F. P. MUSSUN.